US012663698B2

(12) United States Patent
Stern et al.

(10) Patent No.: US 12,663,698 B2
(45) Date of Patent: Jun. 23, 2026

(54) MODULAR ACTION CAMERA LENS ASSEMBLY AND MOUNTING SYSTEM

(71) Applicant: GoPro, Inc., San Mateo, CA (US)

(72) Inventors: Jonathan Stern, San Mateo, CA (US); Peiqian Zhao, Mountain View, CA (US)

(73) Assignee: GoPro, Inc., San Mateo, CA (US)

( * ) Notice: Subject to any disclaimer, the term of this patent is extended or adjusted under 35 U.S.C. 154(b) by 345 days.

(21) Appl. No.: 18/274,073

(22) PCT Filed: Jan. 25, 2022

(86) PCT No.: PCT/US2022/013741
§ 371 (c)(1),
(2) Date: Jul. 25, 2023

(87) PCT Pub. No.: WO2022/164821
PCT Pub. Date: Aug. 4, 2022

(65) Prior Publication Data
US 2024/0053662 A1 Feb. 15, 2024

Related U.S. Application Data

(60) Provisional application No. 63/142,114, filed on Jan. 27, 2021.

(51) Int. Cl.
*G03B 17/14* (2021.01)
*G02B 3/04* (2006.01)
(Continued)

(52) U.S. Cl.
CPC ............... *G03B 17/14* (2013.01); *G02B 3/04* (2013.01); *G02B 7/021* (2013.01); *G02B 27/30* (2013.01); *G03B 17/565* (2013.01)

(58) Field of Classification Search
CPC ...... G03B 17/14; G03B 17/565; G03B 17/12; G02B 3/04; G02B 7/021; G02B 27/30;
(Continued)

(56) References Cited

U.S. PATENT DOCUMENTS 10,509,213 B1 * 12/2019 Monari ................ G02B 15/163
11,487,108 B2 * 11/2022 Lai .......................... G02B 23/22
(Continued)

FOREIGN PATENT DOCUMENTS

JP 2000292696 A 10/2000

OTHER PUBLICATIONS

International Preliminary Report on Patentability issued in App. No. PCT/US2022/013741, mailing date Aug. 10, 2023, 6 pages.
(Continued)

*Primary Examiner* — Abdelaaziz Tissire
(74) *Attorney, Agent, or Firm* — Young Basile Hanlon & MacFarlane, P.C.

(57) ABSTRACT

Modular lens assemblies and mounting systems are disclosed. A modular lens assembly includes a removable portion and a fixed portion. The removable portion includes a first lens stack configured to produce a near-collimated ray path or a collimated ray path. The fixed portion includes a second lens stack configured to receive the near-collimated ray path or the collimated ray path from the removable portion. The modular lens assembly may be implemented in an image capture device. An image sensor of the image capture device is positioned at an end of the modular lens assembly. The image sensor is configured to capture images based on light incident on the image sensor through the first lens stack and the second lens stack such that the light incident on an outer lens of the first lens stack is refracted through the second lens stack to the image sensor.

20 Claims, 11 Drawing Sheets

(51) Int. Cl.
    *G02B 7/02*        (2021.01)
    *G02B 27/30*     (2006.01)
    *G03B 17/56*     (2021.01)

(58) Field of Classification Search
    CPC . G02B 7/14; G02B 9/64; G02B 13/04; G02B
                               15/06; H04N 23/55
    See application file for complete search history.

(56)                    References Cited

U.S. PATENT DOCUMENTS

| | | | |
|---|---|---|---|
| 2004/0156048 A1* | 8/2004 | Mitchell | G01J 3/2823 |
| | | | 356/305 |
| 2010/0214665 A1 | 8/2010 | Hatakeyama | |
| 2013/0010375 A1* | 1/2013 | Chen | G02B 13/18 |
| | | | 359/715 |
| 2015/0124341 A1* | 5/2015 | Lai | G02B 15/10 |
| | | | 359/784 |
| 2017/0023781 A1* | 1/2017 | Wang | G02B 15/1425 |
| 2017/0293118 A1* | 10/2017 | Huang | G02B 7/023 |
| 2018/0210173 A1* | 7/2018 | Blahnik | H04N 23/57 |
| 2018/0252989 A1* | 9/2018 | Okada | G03B 17/14 |

OTHER PUBLICATIONS

International Search Report and Written Opinion issued in App. No. PCT/US2022/013741, mailing date Apr. 28, 2022, 7 pages.

* cited by examiner

MODULAR ACTION CAMERA LENS ASSEMBLY AND MOUNTING SYSTEM

CROSS-REFERENCE TO RELATED APPLICATIONS

This application is a 371 of International Application No. PCT/US2022/013741 filed on Jan. 25, 2022, which claims the priority to U.S. Provisional Application No. 63/142,114, filed on Jan. 27, 2021, the entire disclosures of which are hereby incorporated by reference.

TECHNICAL FIELD

This disclosure relates to modular camera lens assemblies and mounting systems.

BACKGROUND

Image capture devices, such as cameras, may capture content as images (e.g., still images or frames of video). Light may be received and focused via a lens and may be converted to an electronic image signal by an image sensor. The image signal may be processed by an image signal processor (ISP) to form an image, which may be stored and/or encoded. In some implementations, multiple images or video frames may include spatially adjacent or overlapping content. It is sometimes helpful to use an accessory lens to alter a field-of-view (FOV), however existing cameras typically have large FOVs that limit the versatility of accessory lenses. For example, an accessory lens with a narrow FOV would become very large, heavy, and expensive to use with existing cameras.

SUMMARY

Disclosed herein are implementations of modular camera lens assemblies and mounting systems. In an aspect, an image capture device may include a device housing, a modular lens assembly, and an image sensor. The modular lens assembly may include a removable portion and a fixed portion. The removable portion may be partially external to the device housing or external to the device housing. The removable portion may include a first lens stack. The first lens stack may be configured to produce a near-collimated ray path or a collimated ray path. The fixed portion may be partially internal to the device housing or internal to the device housing. The fixed portion may include a second lens stack. The second lens stack may be configured to receive the near-collimated ray path or the collimated ray path from the removable portion. The image sensor may be positioned at an end of the modular lens assembly. The image sensor may be configured to capture images based on light incident on the image sensor through the first lens stack and the second lens stack such that the light incident on an outer lens of the first lens stack is refracted through the second lens stack to the image sensor.

In an aspect, an image capture device may include a device housing, a modular lens assembly, and an image sensor. The modular lens assembly may include a fixed portion configured to receive a removable portion. The removable portion may be partially external to the device housing or external to the device housing. The removable portion may include a first lens stack. The first lens stack may include an optical device. The optical device may be an aperture stop or a filter. The fixed portion may be partially internal to the device housing or internal to the device housing. The fixed portion may include a second lens stack. The image sensor may be positioned at an end of the modular lens assembly. The image sensor may be configured to capture images based on light incident on the image sensor through the first lens stack and the second lens stack such that the light incident on an outer lens of the first lens stack is refracted through the second lens stack to the image sensor.

In an aspect, a modular lens assembly mounting system may include a modular lens assembly and a fixed lens mount. The modular lens assembly may include a removable portion and a fixed portion. The removable portion may include at least one lens and a first barrel. The first barrel may include a first connector. The fixed portion may include at least one lens and a second barrel. The second barrel may include a second connector. The second connector may be configured to connect to the first connector. The fixed lens mount may be configured to secure the fixed portion in place via the second barrel. The fixed lens mount may include at least one guide. The at least one guide may be configured to ensure proper attachment of the removable portion.

In one or more aspects, the removable portion may determine any combination of a field-of-view, and aperture stop, an optical distortion, a depth-of-field, and a focal distance. In one or more aspects, a glass element may be positioned between the fixed portion and the removable portion. In one or more aspects, the glass element may be flush with the device housing, protruding from the device housing, or recessed within the device housing. In one or more aspects, an aperture stop may be positioned at an end of the removable portion. In one or more aspects, a filter may be positioned at an end of the removable portion. In one or more aspects, the filter may be a neutral density filter. In one or more aspects, the neutral density filter may be an electrically adjustable liquid-crystal display based neutral density filter. In one or more aspects, the first lens stack may include an L1 lens, an L2 lens, an L3 lens, and an L4 lens. In one or more aspects, the L1 lens, the L3 lens, or both, may be spherical elements. In one or more aspects, the L2 lens, the L4 lens, or both, may be aspherical elements. In one or more aspects, the second lens stack may include an L5 lens, an L6 lens, an L7 lens, and an L8 lens. In one or more aspects, the L5 lens, the L6 lens, the L7 lens, or any combination thereof, may be spherical elements. In one or more aspects, the L8 lens may be an aspherical element. In one or more aspects, the fixed portion may have a narrow field-of-view. In one or more aspects, the fixed portion may be afocal. In one or more aspects, the narrow field-of-view may be a diagonal field-of-view between 200 and 40°.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Embodiments described herein may include lens assemblies where a typical fixed lens assembly is split into a fixed portion and a removable portion. For example, camera lens system designs are described in which one group of lens assembly (e.g., a removable lens) can be attached or detached to another group of lens (e.g., a fixed lens) so that angular view of view and magnifications of a camera system can be changed. When attaching the removable lens to the fixed lens, the removable lens mounting tolerance may be lowered to enable lower cost material and or manufacturing methods for a camera.

For example, this disclosure describes designs of a camera lens system. This lens system is composed of two lens assembly groups. One lens assembly group, called a fixed lens, may be permanently embedded in a camera and another lens assembly group, called a removable lens, can be removably attached or detached to the camera by a user and can be aligned to the fixed lens automatically. When the removable lens is off the camera, the camera may have a smaller angular field of view and larger magnification. When the removable lens is attached to the camera, the camera may have a larger angular field of view and smaller magnification is generated, making it possible for super smooth operation. In some implementations, the removable lens can be attached to the fixed lens with loose mounting tolerance without compromising the image quality, so that a lower cost removable lens and easy mounting become possible.

By splitting the typical fixed lens into a removable portion and a fixed portion, a wide range of adapters (i.e., removable portions) may be implemented to meet certain size, weight, and cost objectives. The increased versatility of the optics allow for the camera to be switched between different fields of view, f-numbers, optical distortions, depth-of-field (DOF), and focal distances. The modularity of the embodiments disclosed herein may apply to the factory level to allow above configuration at final assembly. The modularity at the lens element level may allow for sub-component re-use.

In some embodiments, the fixed portion may be designed to accommodate the lower range of f-numbers. In some embodiments, each removable portion may include its own aperture to allow the f-number to change between configurations. In some embodiments, the light ray paths between the two lens portions may be near-collimated to collimated to minimize the sensitivity to mounting errors between the two portions. In some embodiments, a glass element, such as a flat glass may be included between the two lens portions to act as a dust and water seal. In some embodiments, focus may be achieved by actuating one or more image sensors, the fixed portion, the removable portion, or any combination thereof.

Figure 1A:
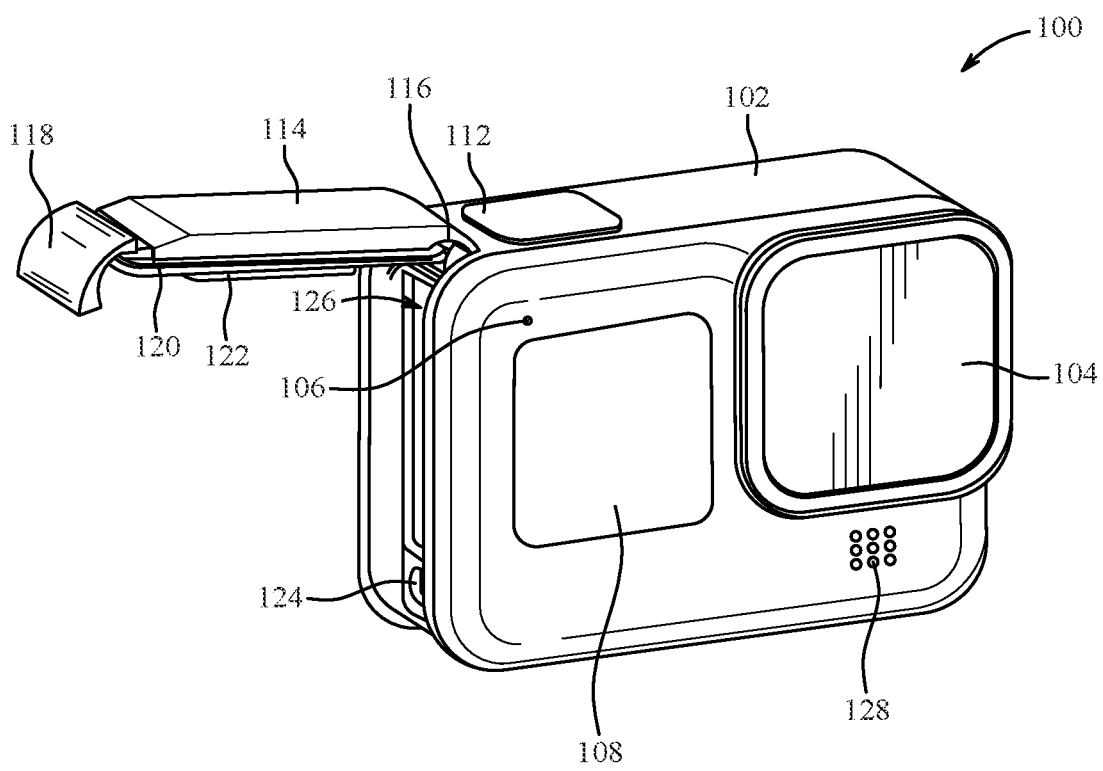
FIGS. 1A-B are isometric views of an example of an image capture device.
Figure 1B:
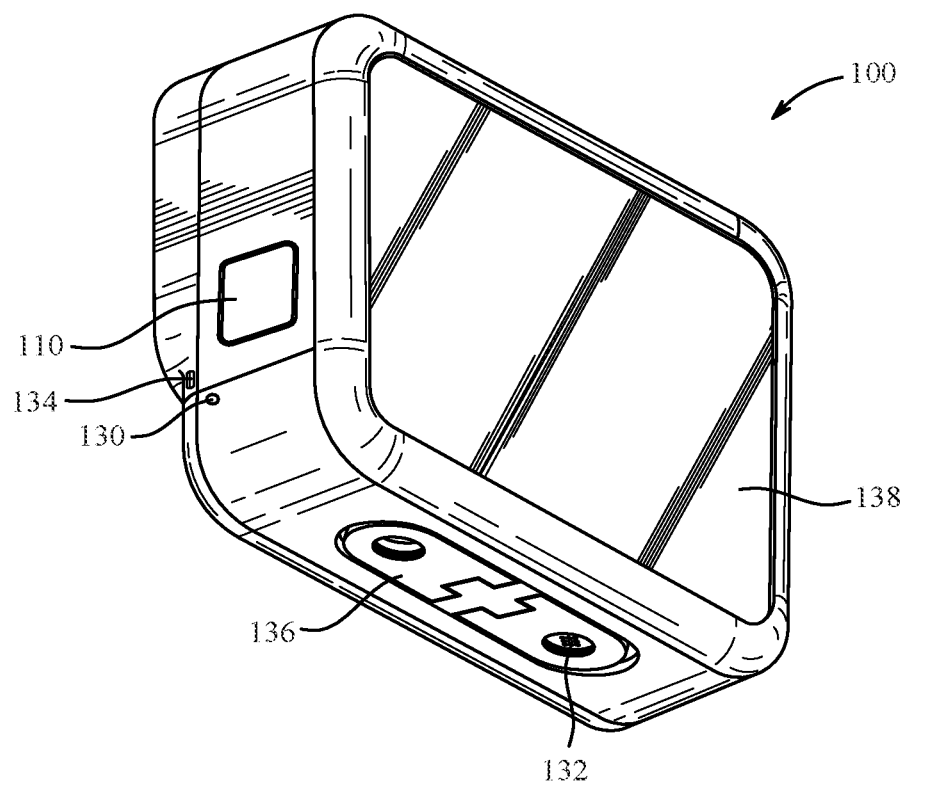

FIGS. 1A-B are isometric views of an example of an image capture device 100. The image capture device 100 may include a body 102, a lens 104 structured on a front surface of the body 102, various indicators on the front surface of the body 102 (such as light-emitting diodes (LEDs), displays, and the like), various input mechanisms (such as buttons, switches, and/or touch-screens), and electronics (such as imaging electronics, power electronics, etc.) internal to the body 102 for capturing images via the lens 104 and/or performing other functions. The lens 104 is configured to receive light incident upon the lens 104 and to direct received light onto an image sensor internal to the body 102. The image capture device 100 may be configured to capture images and video and to store captured images and video for subsequent display or playback.

The image capture device 100 may include an LED or another form of indicator 106 to indicate a status of the image capture device 100 and a liquid-crystal display (LCD) or other form of a display 108 to show status information such as battery life, camera mode, elapsed time, and the like. The image capture device 100 may also include a mode button 110 and a shutter button 112 that are configured to allow a user of the image capture device 100 to interact with the image capture device 100. For example, the mode button 110 and the shutter button 112 may be used to turn the image capture device 100 on and off, scroll through modes and settings, and select modes and change settings. The image capture device 100 may include additional buttons or interfaces (not shown) to support and/or control additional functionality.

The image capture device 100 may include a door 114 coupled to the body 102, for example, using a hinge mechanism 116. The door 114 may be secured to the body 102 using a latch mechanism 118 that releasably engages the body 102 at a position generally opposite the hinge mechanism 116. The door 114 may also include a seal 120 and a battery interface 122. When the door 114 is an open position, access is provided to an input-output (I/O) interface 124 for connecting to or communicating with external devices as described below and to a battery receptacle 126 for placement and replacement of a battery (not shown). The battery receptacle 126 includes operative connections (not shown) for power transfer between the battery and the image capture device 100. When the door 114 is in a closed position, the seal 120 engages a flange (not shown) or other interface to provide an environmental seal, and the battery interface 122 engages the battery to secure the battery in the battery receptacle 126. The door 114 can also have a removed position (not shown) where the entire door 114 is separated from the image capture device 100, that is, where both the hinge mechanism 116 and the latch mechanism 118 are decoupled from the body 102 to allow the door 114 to be removed from the image capture device 100.

The image capture device 100 may include a microphone 128 on a front surface and another microphone 130 on a side surface. The image capture device 100 may include other microphones on other surfaces (not shown). The microphones 128, 130 may be configured to receive and record audio signals in conjunction with recording video or separate from recording of video. The image capture device 100 may include a speaker 132 on a bottom surface of the image capture device 100. The image capture device 100 may include other speakers on other surfaces (not shown). The speaker 132 may be configured to play back recorded audio or emit sounds associated with notifications.

A front surface of the image capture device 100 may include a drainage channel 134. A bottom surface of the image capture device 100 may include an interconnect mechanism 136 for connecting the image capture device 100 to a handle grip or other securing device. In the example shown in FIG. 1B, the interconnect mechanism 136 includes folding protrusions configured to move between a nested or collapsed position as shown and an extended or open position (not shown) that facilitates coupling of the protrusions to mating protrusions of other devices such as handle grips, mounts, clips, or like devices.

The image capture device 100 may include an interactive display 138 that allows for interaction with the image capture device 100 while simultaneously displaying information on a surface of the image capture device 100.

The image capture device 100 of FIGS. 1A-B includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes, and hot shoes that can add functional features to the image capture device 100.

The image capture device 100 may include various types of image sensors, such as charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera system-on-chip (SoC), etc.), which may be included on one or more circuit boards within the body 102 of the image capture device 100.

The image capture device 100 may interface with or communicate with an external device, such as an external user interface device (not shown), via a wired or wireless computing communication link (e.g., the I/O interface 124). Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the external user interface device via the computing communication link, and the external user interface device may store, process, display, or a combination thereof the panoramic images.

The external user interface device may be a computing device, such as a smartphone, a tablet computer, a phablet, a smart watch, a portable computer, personal computing device, and/or another device or combination of devices configured to receive user input, communicate information with the image capture device 100 via the computing communication link, or receive user input and communicate information with the image capture device 100 via the computing communication link.

The external user interface device may display, or otherwise present, content, such as images or video, acquired by the image capture device 100. For example, a display of the external user interface device may be a viewport into the three-dimensional space represented by the panoramic images or video captured or created by the image capture device 100.

The external user interface device may communicate information, such as metadata, to the image capture device 100. For example, the external user interface device may send orientation information of the external user interface device with respect to a defined coordinate system to the image capture device 100, such that the image capture device 100 may determine an orientation of the external user interface device relative to the image capture device 100.

Based on the determined orientation, the image capture device 100 may identify a portion of the panoramic images or video captured by the image capture device 100 for the image capture device 100 to send to the external user interface device for presentation as the viewport. In some implementations, based on the determined orientation, the image capture device 100 may determine the location of the external user interface device and/or the dimensions for viewing of a portion of the panoramic images or video.

The external user interface device may implement or execute one or more applications to manage or control the image capture device 100. For example, the external user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the external user interface device, such as via an application, may remotely control the image capture device 100 such as in response to user input.

The external user interface device, such as via an application, may display unprocessed or minimally processed images or video captured by the image capture device 100 contemporaneously with capturing the images or video by the image capture device 100, such as for shot framing or live preview, and which may be performed in response to user input. In some implementations, the external user interface device, such as via an application, may mark one or more key moments contemporaneously with capturing the images or video by the image capture device 100, such as with a tag or highlight in response to a user input or user gesture.

The external user interface device, such as via an application, may display or otherwise present marks or tags associated with images or video, such as in response to user input. For example, marks may be presented in a camera roll application for location review and/or playback of video highlights.

The external user interface device, such as via an application, may wirelessly control camera software, hardware, or both. For example, the external user interface device may include a web-based graphical interface accessible by a user for selecting a live or previously recorded video stream from the image capture device 100 for display on the external user interface device.

The external user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2A:
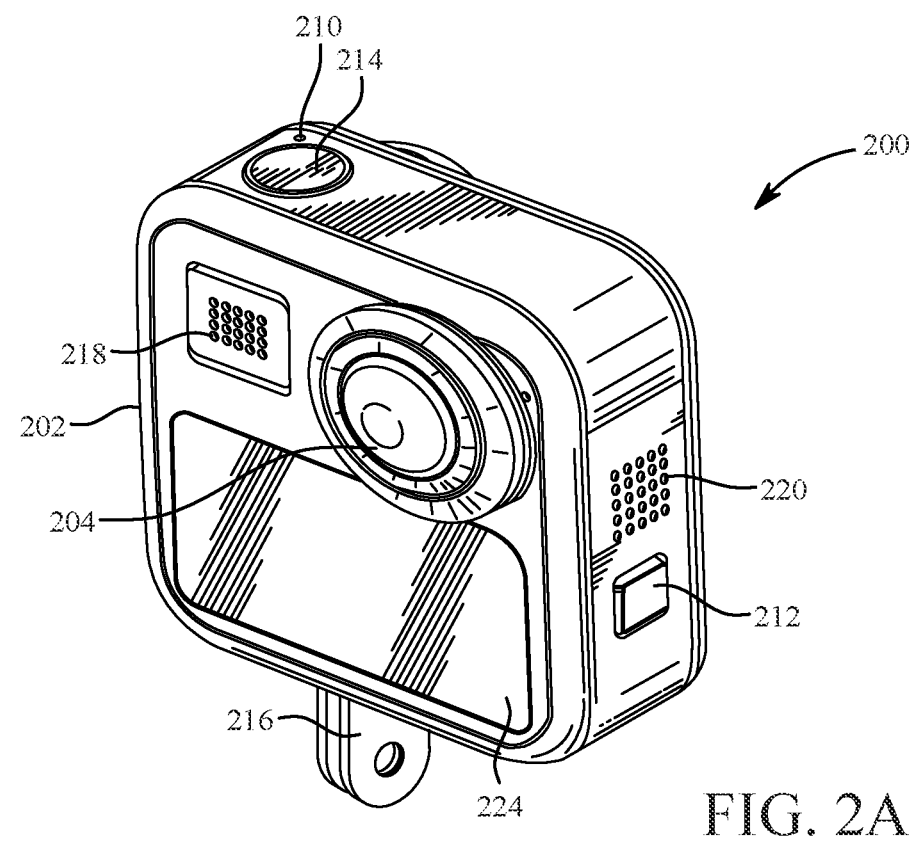
FIGS. 2A-B are isometric views of another example of an image capture device.
Figure 2B:
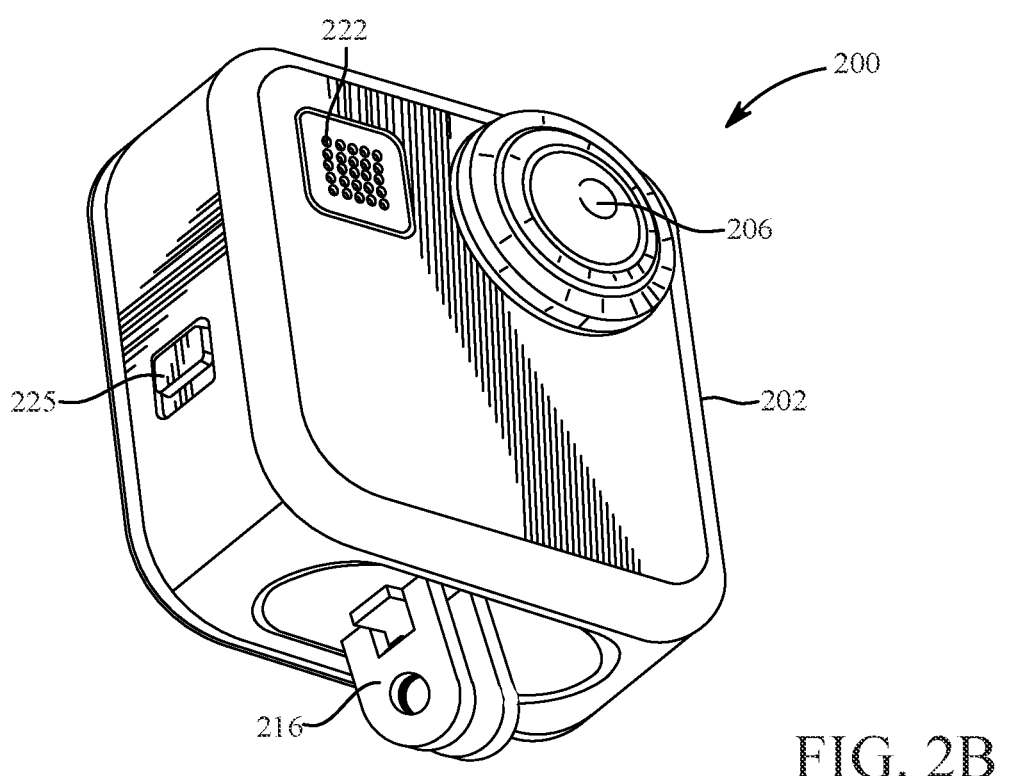

FIGS. 2A-B illustrate another example of an image capture device 200. The image capture device 200 includes a body 202 and two camera lenses 204 and 206 disposed on opposing surfaces of the body 202, for example, in a back-to-back configuration, Janus configuration, or offset Janus configuration. The body 202 of the image capture device 200 may be made of a rigid material such as plastic, aluminum, steel, or fiberglass.

The image capture device 200 includes various indicators on the front of the surface of the body 202 (such as LEDs, displays, and the like), various input mechanisms (such as buttons, switches, and touch-screen mechanisms), and electronics (e.g., imaging electronics, power electronics, etc.) internal to the body 202 that are configured to support image capture via the two camera lenses 204 and 206 and/or perform other imaging functions.

The image capture device 200 includes various indicators, for example, LEDs 208, 210 to indicate a status of the image capture device 100. The image capture device 200 may include a mode button 212 and a shutter button 214 configured to allow a user of the image capture device 200 to interact with the image capture device 200, to turn the image capture device 200 on, and to otherwise configure the operating mode of the image capture device 200. It should be appreciated, however, that, in alternate embodiments, the image capture device 200 may include additional buttons or inputs to support and/or control additional functionality.

The image capture device 200 may include an interconnect mechanism 216 for connecting the image capture device 200 to a handle grip or other securing device. In the example shown in FIGS. 2A and 2B, the interconnect mechanism 216 includes folding protrusions configured to move between a nested or collapsed position (not shown) and an extended or open position as shown that facilitates coupling of the protrusions to mating protrusions of other devices such as handle grips, mounts, clips, or like devices.

The image capture device 200 may include audio components 218, 220, 222 such as microphones configured to receive and record audio signals (e.g., voice or other audio commands) in conjunction with recording video. The audio component 218, 220, 222 can also be configured to play back audio signals or provide notifications or alerts, for example, using speakers. Placement of the audio components 218, 220, 222 may be on one or more of several surfaces of the image capture device 200. In the example of FIGS. 2A and 2B, the image capture device 200 includes three audio components 218, 220, 222, with the audio component 218 on a front surface, the audio component 220 on a side surface, and the audio component 222 on a back surface of the image capture device 200. Other numbers and configurations for the audio components are also possible.

The image capture device 200 may include an interactive display 224 that allows for interaction with the image capture device 200 while simultaneously displaying information on a surface of the image capture device 200. The interactive display 224 may include an I/O interface, receive touch inputs, display image information during video capture, and/or provide status information to a user. The status information provided by the interactive display 224 may include battery power level, memory card capacity, time elapsed for a recorded video, etc.

The image capture device 200 may include a release mechanism 225 that receives a user input to in order to change a position of a door (not shown) of the image capture device 200. The release mechanism 225 may be used to open the door (not shown) in order to access a battery, a battery receptacle, an I/O interface, a memory card interface, etc. (not shown) that are similar to components described in respect to the image capture device 100 of FIGS. 1A and 1B.

In some embodiments, the image capture device 200 described herein includes features other than those described. For example, instead of the I/O interface and the interactive display 224, the image capture device 200 may include additional interfaces or different interface features. For example, the image capture device 200 may include additional buttons or different interface features, such as interchangeable lenses, cold shoes, and hot shoes that can add functional features to the image capture device 200.

Figure 2C:
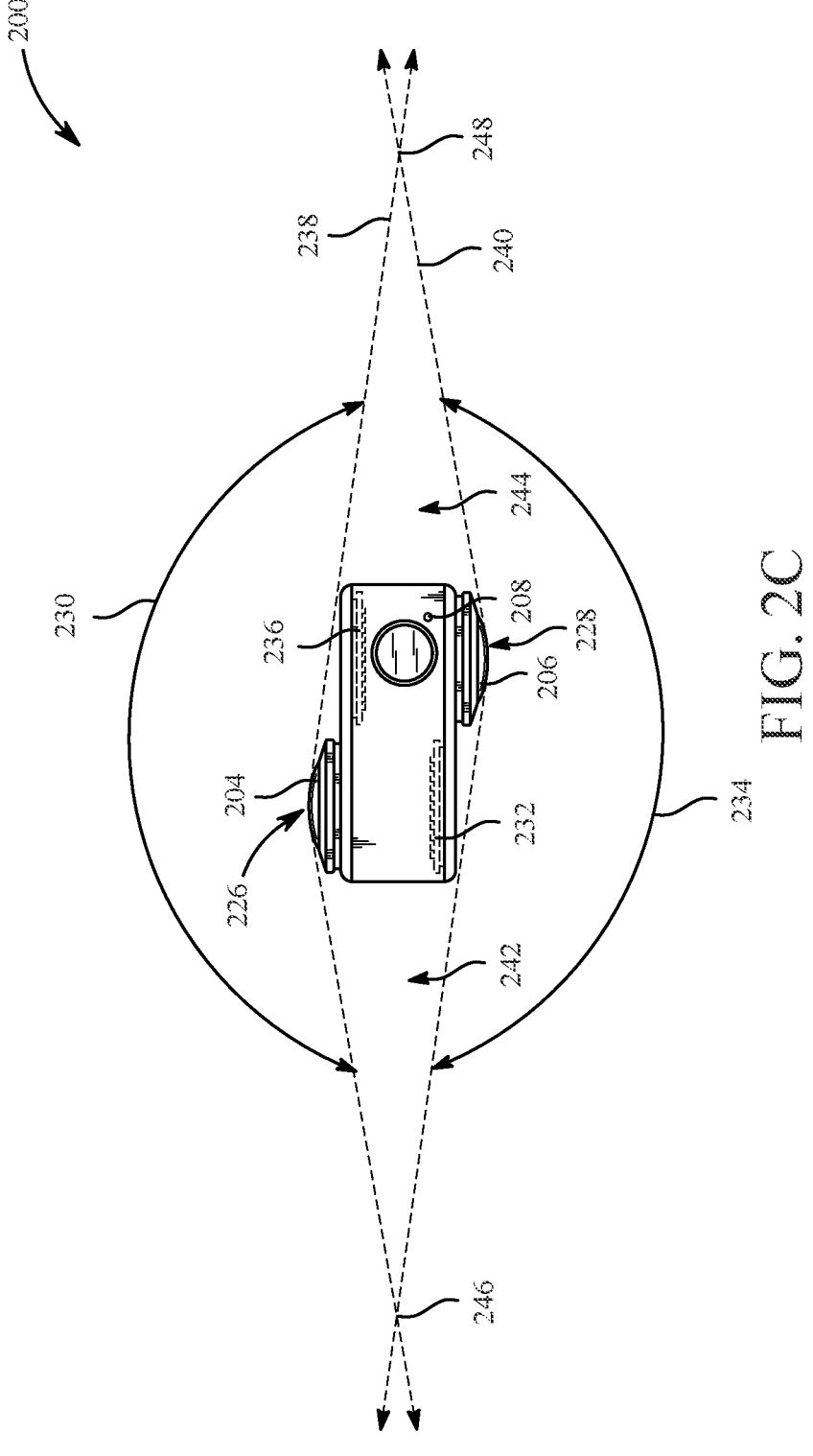
FIG. 2C is a top view of the image capture device of FIGS. 2A-B.
Figure 2D:
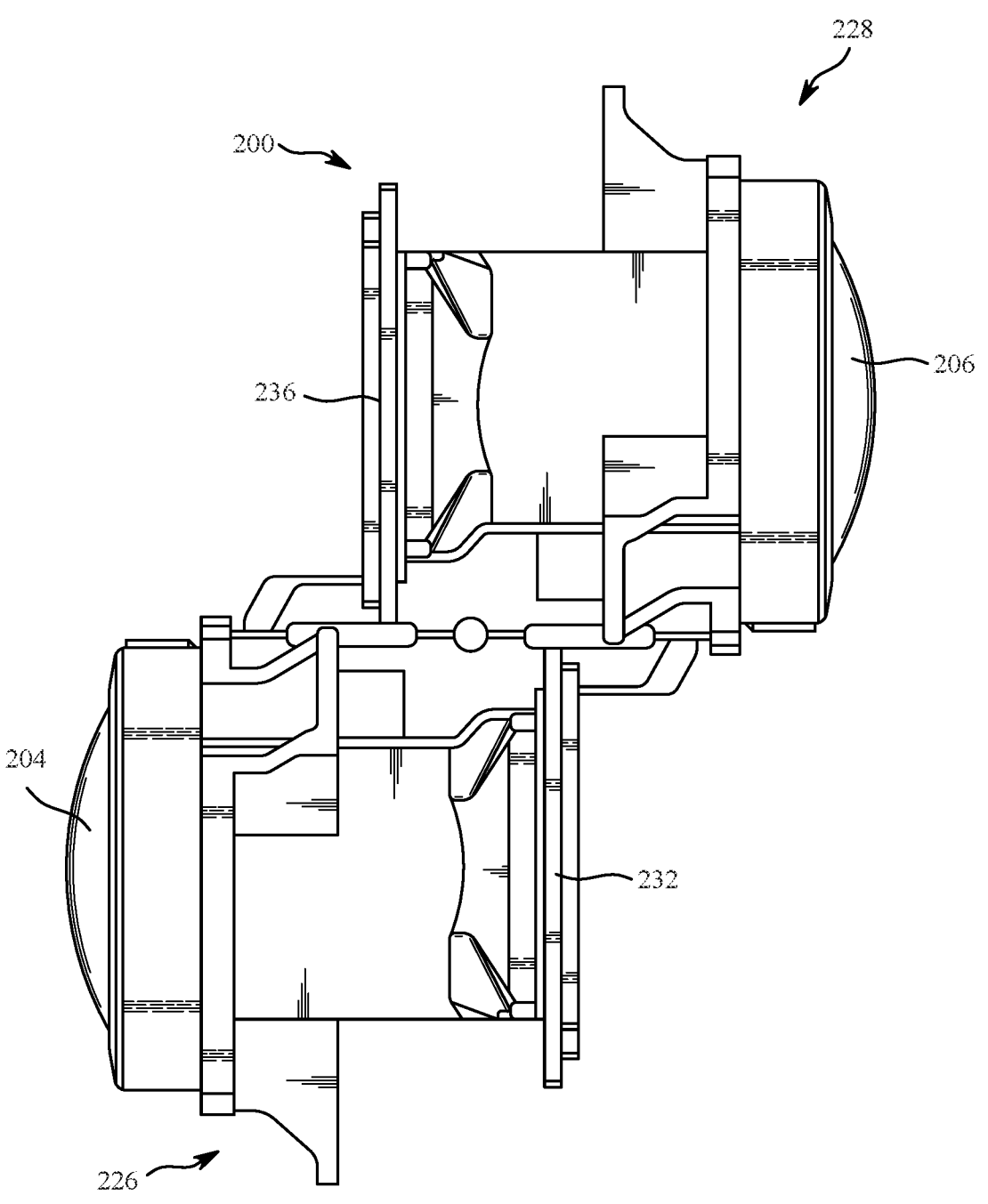
FIG. 2D is a partial cross-sectional view of the image capture device of FIG. 2C.

FIG. 2C is a top view of the image capture device 200 of FIGS. 2A-B and FIG. 2D is a partial cross-sectional view of the image capture device 200 of FIG. 2C. The image capture device 200 is configured to capture spherical images, and accordingly, includes a first image capture device 226 and a second image capture device 228. The first image capture device 226 defines a first field-of-view 230 and includes the lens 204 that receives and directs light onto a first image sensor 232. Similarly, the second image capture device 228 defines a second field-of-view 234 and includes the lens 206 that receives and directs light onto a second image sensor 236. To facilitate the capture of spherical images, the image capture devices 226 and 228 (and related components) may be arranged in a back-to-back (Janus) configuration such that the lenses 204, 206 face in generally opposite directions.

The fields-of-view 230, 234 of the lenses 204, 206 are shown above and below boundaries 238, 240 indicated in dotted line. Behind the first lens 204, the first image sensor 232 may capture a first hyper-hemispherical image plane from light entering the first lens 204, and behind the second lens 206, the second image sensor 236 may capture a second hyper-hemispherical image plane from light entering the second lens 206.

One or more areas, such as blind spots 242, 244 may be outside of the fields-of-view 230, 234 of the lenses 204, 206 so as to define a "dead zone." In the dead zone, light may be obscured from the lenses 204, 206 and the corresponding image sensors 232, 236, and content in the blind spots 242, 244 may be omitted from capture. In some implementations, the image capture devices 226, 228 may be configured to minimize the blind spots 242, 244.

The fields-of-view 230, 234 may overlap. Stitch points 246, 248 proximal to the image capture device 200, that is, locations at which the fields-of-view 230, 234 overlap, may be referred to herein as overlap points or stitch points. Content captured by the respective lenses 204, 206 that is distal to the stitch points 246, 248 may overlap.

Images contemporaneously captured by the respective image sensors 232, 236 may be combined to form a combined image. Generating a combined image may include correlating the overlapping regions captured by the respective image sensors 232, 236, aligning the captured fields-of-view 230, 234, and stitching the images together to form a cohesive combined image.

A slight change in the alignment, such as position and/or tilt, of the lenses 204, 206, the image sensors 232, 236, or both, may change the relative positions of their respective fields-of-view 230, 234 and the locations of the stitch points 246, 248. A change in alignment may affect the size of the blind spots 242, 244, which may include changing the size of the blind spots 242, 244 unequally.

Incomplete or inaccurate information indicating the alignment of the image capture devices 226, 228, such as the locations of the stitch points 246, 248, may decrease the accuracy, efficiency, or both of generating a combined image. In some implementations, the image capture device 200 may maintain information indicating the location and orientation of the lenses 204, 206 and the image sensors 232, 236 such that the fields-of-view 230, 234, the stitch points 246, 248, or both may be accurately determined; the maintained information may improve the accuracy, efficiency, or both of generating a combined image.

The lenses 204, 206 may be laterally offset from each other, may be off-center from a central axis of the image capture device 200, or may be laterally offset and off-center from the central axis. As compared to image capture devices with back-to-back lenses, such as lenses aligned along the same axis, image capture devices including laterally offset lenses may include substantially reduced thickness relative to the lengths of the lens barrels securing the lenses. For example, the overall thickness of the image capture device 200 may be close to the length of a single lens barrel as opposed to twice the length of a single lens barrel as in a back-to-back lens configuration. Reducing the lateral distance between the lenses 204, 206 may improve the overlap in the fields-of-view 230, 234. In another embodiment (not shown), the lenses 204, 206 may be aligned along a common imaging axis.

Images or frames captured by the image capture devices 226, 228 may be combined, merged, or stitched together to produce a combined image, such as a spherical or panoramic image, which may be an equirectangular planar image. In some implementations, generating a combined image may include use of techniques including noise reduction, tone mapping, white balancing, or other image correction. In some implementations, pixels along the stitch boundary may be matched accurately to minimize boundary discontinuities.

Figure 3:
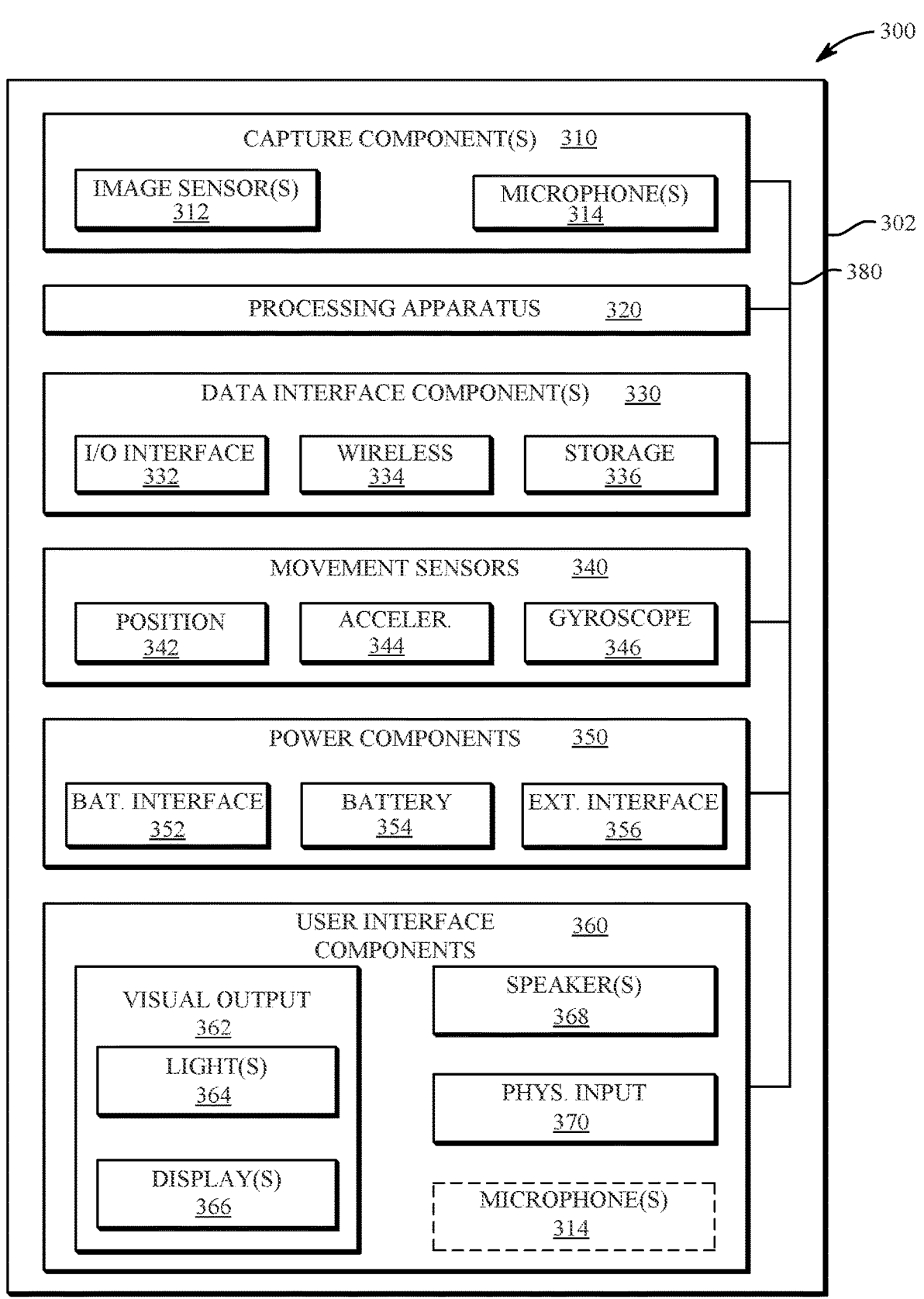
FIG. 3 is a block diagram of electronic components of an image capture device.

FIG. 3 is a block diagram of electronic components in an image capture device 300. The image capture device 300 may be a single-lens image capture device, a multi-lens image capture device, or variations thereof, including an image capture device with multiple capabilities such as use of interchangeable integrated sensor lens assemblies. The description of the image capture device 300 is also applicable to the image capture devices 100, 200 of FIGS. 1A-B and 2A-D.

The image capture device 300 includes a body 302 which includes electronic components such as capture components 310, a processing apparatus 320, data interface components 330, movement sensors 340, power components 350, and/or user interface components 360.

The capture components 310 include one or more image sensors 312 for capturing images and one or more microphones 314 for capturing audio.

The image sensor(s) 312 is configured to detect light of a certain spectrum (e.g., the visible spectrum or the infrared spectrum) and convey information constituting an image as electrical signals (e.g., analog or digital signals). The image sensor(s) 312 detects light incident through a lens coupled or connected to the body 302. The image sensor(s) 312 may be any suitable type of image sensor, such as a charge-coupled device (CCD) sensor, active pixel sensor (APS), complementary metal-oxide-semiconductor (CMOS) sensor, N-type metal-oxide-semiconductor (NMOS) sensor, and/or any other image sensor or combination of image sensors. Image signals from the image sensor(s) 312 may be passed to other electronic components of the image capture device 300 via a bus 380, such as to the processing apparatus 320. In some implementations, the image sensor(s) 312 includes a digital-to-analog converter. A multi-lens variation of the image capture device 300 can include multiple image sensors 312.

The microphone(s) 314 is configured to detect sound, which may be recorded in conjunction with capturing images to form a video. The microphone(s) 314 may also detect sound in order to receive audible commands to control the image capture device 300.

The processing apparatus 320 may be configured to perform image signal processing (e.g., filtering, tone mapping, stitching, and/or encoding) to generate output images based on image data from the image sensor(s) 312. The processing apparatus 320 may include one or more processors having single or multiple processing cores. In some implementations, the processing apparatus 320 may include an application specific integrated circuit (ASIC). For example, the processing apparatus 320 may include a custom image signal processor. The processing apparatus 320 may exchange data (e.g., image data) with other components of the image capture device 300, such as the image sensor(s) 312, via the bus 380.

The processing apparatus 320 may include memory, such as a random-access memory (RAM) device, flash memory, or another suitable type of storage device, such as a non-transitory computer-readable memory. The memory of the processing apparatus 320 may include executable instructions and data that can be accessed by one or more processors of the processing apparatus 320. For example, the processing apparatus 320 may include one or more dynamic random-access memory (DRAM) modules, such as double data rate synchronous dynamic random-access memory (DDR SDRAM). In some implementations, the processing apparatus 320 may include a digital signal processor (DSP). More than one processing apparatus may also be present or associated with the image capture device 300.

The data interface components 330 enable communication between the image capture device 300 and other electronic devices, such as a remote control, a smartphone, a tablet computer, a laptop computer, a desktop computer, or a storage device. For example, the data interface components 330 may be used to receive commands to operate the image capture device 300, transfer image data to other electronic devices, and/or transfer other signals or information to and from the image capture device 300. The data interface components 330 may be configured for wired and/or wireless communication. For example, the data interface components 330 may include an I/O interface 332 that provides wired communication for the image capture device, which may be a USB interface (e.g., USB type-C), a high-definition multimedia interface (HDMI), or a FireWire interface. The data interface components 330 may include a wireless data interface 334 that provides wireless communication for the image capture device 300, such as a Bluetooth interface, a ZigBee interface, and/or a Wi-Fi interface. The data interface components 330 may include a storage interface 336, such as a memory card slot configured to receive and operatively couple to a storage device (e.g., a memory card) for data transfer with the image capture device 300 (e.g., for storing captured images and/or recorded audio and video).

The movement sensors 340 may detect the position and movement of the image capture device 300. The movement sensors 340 may include a position sensor 342, an accelerometer 344, or a gyroscope 346. The position sensor 342, such as a global positioning system (GPS) sensor, is used to determine a position of the image capture device 300. The accelerometer 344, such as a three-axis accelerometer, measures linear motion (e.g., linear acceleration) of the image capture device 300. The gyroscope 346, such as a three-axis gyroscope, measures rotational motion (e.g., rate of rotation) of the image capture device 300. Other types of movement sensors 340 may also be present or associated with the image capture device 300.

The power components 350 may receive, store, and/or provide power for operating the image capture device 300. The power components 350 may include a battery interface 352 and a battery 354. The battery interface 352 operatively couples to the battery 354, for example, with conductive contacts to transfer power from the battery 354 to the other electronic components of the image capture device 300. The power components 350 may also include an external interface 356, and the power components 350 may, via the external interface 356, receive power from an external source, such as a wall plug or external battery, for operating the image capture device 300 and/or charging the battery 354 of the image capture device 300. In some implementations, the external interface 356 may be the I/O interface 332. In such an implementation, the I/O interface 332 may enable the power components 350 to receive power from an external source over a wired data interface component (e.g., a USB type-C cable).

The user interface components 360 may allow the user to interact with the image capture device 300, for example, providing outputs to the user and receiving inputs from the user. The user interface components 360 may include visual output components 362 to visually communicate information and/or present captured images to the user. The visual output components 362 may include one or more lights 364 and/or more displays 366. The display(s) 366 may be configured as a touch screen that receives inputs from the user. The user interface components 360 may also include one or more speakers 368. The speaker(s) 368 can function as an audio output component that audibly communicates information and/or presents recorded audio to the user. The user interface components 360 may also include one or more physical input interfaces 370 that are physically manipulated by the user to provide input to the image capture device 300. The physical input interfaces 370 may, for example, be configured as buttons, toggles, or switches. The user interface components 360 may also be considered to include the microphone(s) 314, as indicated in dotted line, and the microphone(s) 314 may function to receive audio inputs from the user, such as voice commands.

Figure 4:
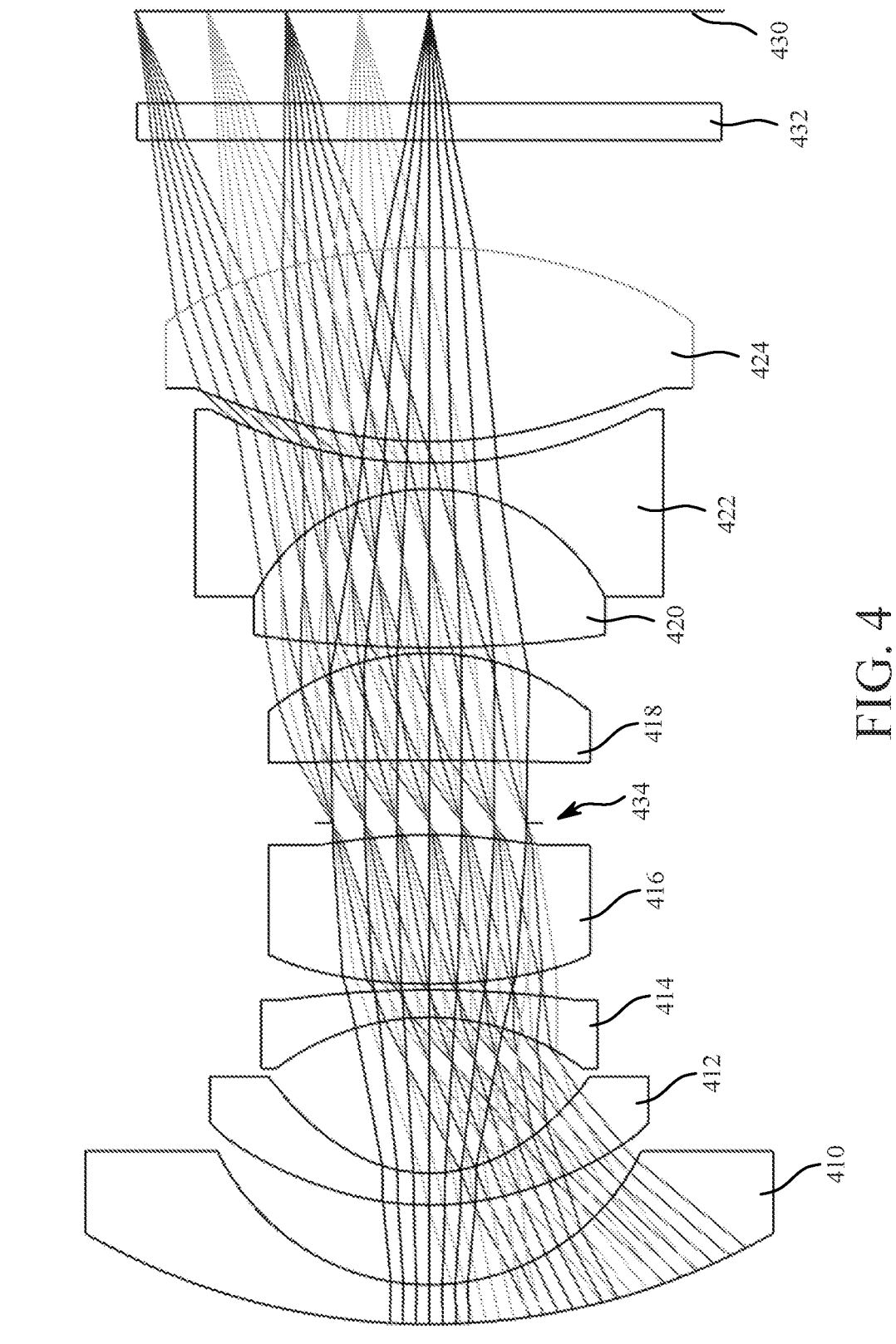
FIG. 4 is a block diagram of a typical fixed lens assembly.

FIG. 4 a block diagram of a typical fixed lens assembly 400. The fixed lens assembly 400 includes a stack of lenses, from outer to inner, including an L1 lens 410, an L2 lens 412, an L3 lens 414, an L4 lens 416, an L5 lens 418, an L6 lens 420, an L7 lens 422, and an L8 lens 424. The stack of lenses (410-424) is configured to focus light incident on the L1 lens 410 on an image plane 430, which may correspond to a light sensitive surface of an image sensor (e.g., the one or more image sensor(s) 312). The refracted light also passes through a sensor cover glass 432 and an aperture stop 434 positioned between the L4 lens 416 and the L5 lens 418.

For example, the fixed lens assembly 400 may have a total track length of 18 millimeters (mm), an relative aperture (F/#) of 2.5, a focal length of 2.711 mm, a design wavelength of 455 nanometers (nm) to 661 nm, a sensor format of 1/2.3 inches, an angular field of view of 95.2° (V)×123.6° (H)× 1530 (D); an image circle of 7.85 mm, and a chief ray angle of 15° at maximum image circle.

The fundamental structure of the fixed lens assembly 400 is a reverse telephoto lens with symmetric configuration about the aperture stop. Hence, the third order astigmatism, third order field curvature and third order lateral color can be roughly cancelled out. The asphere terms of the L8 lens 424 may be used to get specified chief ray angles. Negative elements L1 lens 410 and L2 lens 412 may be used to reduce the pupil aberration. The L1 lens 410, L3 lens 414, L5 lens 418, L6 lens 420 and L7 lens 422 are spherical elements. The L2 lens 412, L4 lens 416 and L8 lens 424 are aspherical elements. The L1 lens 410, L2 lens 412, L3 lens 414, L4 lens 416, L5 lens 418, L6 lens 420, L7 lens 422, and L8 lens 424 may be made of glasses (e.g., with H-ZLAF75A ($n_d$=1.904, $v_d$=31.3), MC-FCD1-M20 ($n_d$=1.497, $v_d$=81.5), H-K9L ($n_d$=1.517, $v_d$=640.2), MC-TAFD307 ($n_d$=1.882, $v_d$=370.2), H-FK61B ($n_d$=1.491, $v_d$=81.6), H-ZPK2 ($n_d$=1.603, $v_d$=65.5), H-ZF50 ($n_d$=1.741, $v_d$=270.8) and MC-FCD1-M20 ($n_d$=1.497, $v_d$=81.5) respectively). In some implementations, these glasses may be replaced with index and abbe numbers. The material of the L1 lens 410 may be made of harder glass to have better anti-scratch quality.

For example, the L1 lens 410 may be spherical and made from H-ZLAF75A (with index of refraction 1.904 and abbe number 31.3) with an outer (object side) radius of curvature of 9.49736415 millimeters (mm), an outer clear semi-diameter of 4.70000000, an inner (sensor side) radius of curvature of 3.21222787 mm, an inner clear semi-diameter of 2.90000000, and a center thickness of 0.540100 mm. The air gap between the L1 lens 410 and the L2 lens 412 has a center thickness of 1.095871 mm. For example, the L2 lens 412 may be even aspherical and made from MC-FCD1-M20 (with index of refraction 1.497 and abbe number 81.5) with an outer (object side) radius of curvature of 4.40140323 mm, an outer clear semi-diameter of 3.00000000, an outer conic constant of 0.820148, an outer $4^{th}$ order coefficient of 1.872683×10^-3, an outer $6^{th}$ order coefficient of −2.20047988×10^-3, an outer $8^{th}$ order coefficient of 4.286681×10^-4, an outer $10^{th}$ order coefficient of −4.468952×10^-5, an outer $12^{th}$ order coefficient of 1.773196×10^-6, an inner (sensor side) radius of curvature of 2.10529873 mm, an inner clear semi-diameter of 2.20000000, an inner conic constant of −0.542206, an inner $4^{th}$ order coefficient of 5.324835×10^-3, an inner $6^{th}$ order coefficient of −2.81974387×10^-3, an inner $8^{th}$ order coefficient of 3.350900×10^-4, an inner $10^{th}$ order coefficient of 5.740625×10^-5, an inner $12^{th}$ order coefficient of −1.286993×10^-5, and a center thickness of 0.436021 mm. The air gap between the L2 lens 412 and the L3 lens 414 has a center thickness of 2.133758 mm. For example, the L3 lens 414 may be spherical and made from H-K9L (with index of refraction 1.517 and abbe number 64.2) with an outer (object side) radius of curvature of −3.48837677 mm, an outer clear semi-diameter of 2.10000000, an inner (sensor side) radius of curvature of −14.84280098 mm, an inner clear semi-diameter of 2.00000000, and a center thickness of 0.374719 mm. The air gap between the L3 lens 414 and the L4 lens 416 has a center thickness of 0.083910 mm. For example, the L4 lens 416 may be even aspherical and made from MC-TAFD307 (with index of refraction 1.882 and abbe number 37.2) with an outer (object side) radius of curvature of 7.21888162 mm, an outer clear semi-diameter of 2.20000000, an outer conic constant of 2.102011, an outer $4^{th}$ order coefficient of $1.150114\times10^\wedge-4$, an outer $6^{th}$ order coefficient of $8.208919\times10^\wedge-5$, an outer $8^{th}$ order coefficient of $1.018711\times10^\wedge-4$, an outer $10^{th}$ order coefficient of $-2.736738\times10^\wedge-5$, an outer $12^{th}$ order coefficient of $3.415871\times10^\wedge-6$, an inner (sensor side) radius of curvature of $-6.92894328$ mm, an inner clear semi-diameter of 1.53080015, an inner conic constant of 14.597079, an inner $4^{th}$ order coefficient of 0.010338, an inner $6^{th}$ order coefficient of $9.473713\times10^\wedge-4$, an inner $8^{th}$ order coefficient of $9.976586\times10^\wedge-4$, an inner $10^{th}$ order coefficient of $-5.270709\times10^\wedge-4$, an inner $12^{th}$ order coefficient of $1.633868\times10^\wedge-4$, and a center thickness of 2.043145 mm. The air gap between the L4 lens 416 and the L5 lens 418 has a center thickness of 0.161574 mm. For example, the aperture stop 434 may have thickness of 0.859133 mm and a clear semi-diameter of 1.32600000. For example, the L5 lens 418 may be spherical and made from H-FK61B (with index of refraction 1.491 and abbe number 81.6) with an outer (object side) radius of curvature of $-58.89618128$ mm, an outer clear semi-diameter of 1.80000000, an inner (sensor side) radius of curvature of $-3.43121656$ mm, an inner clear semi-diameter of 2.20000000, and a center thickness of 1.469225 mm. The air gap between the L5 lens 418 and the L6 lens 420 has a center thickness of 0.077602 mm. For example, the L6 lens 420 may be spherical and made from H-ZPK2A (with index of refraction 1.603 and abbe number 65.5) with an outer (object side) radius of curvature of 16.53944085 mm, an outer clear semi-diameter of 2.40000000, an inner (sensor side) radius of curvature of $-2.68988785$ mm, an inner clear semi-diameter of 2.40000000, and a center thickness of 2.172732 mm. For example, the L7 lens 422 may be spherical and made from H-ZF50 (with index of refraction 1.741 and abbe number 27.8) with an outer (object side) radius of curvature of $-2.68988785$ mm, an outer clear semi-diameter of 2.40000000, an inner (sensor side) radius of curvature of 6.49948177 mm, an inner clear semi-diameter of 3.00000000, and a center thickness of 0.358236 mm. The air gap between the L7 lens 422 and the L8 lens 424 has a center thickness of 0.294461 mm. For example, the L8 lens 424 may be even aspherical and made from MC-FCD1-M20 (with index of refraction 1.497 and abbe number 81.5) with an outer (object side) radius of curvature of 5.89752468 mm, an outer clear semi-diameter of 3.20000000, an outer conic constant of 0.933104, an outer $4^{th}$ order coefficient of $-3.28534081\times10^\wedge-3$, an outer $6^{th}$ order coefficient of $1.101686\times10^\wedge-4$, an outer $8^{th}$ order coefficient of $-1.04554681\times10^\wedge-5$, an outer $10^{th}$ order coefficient of $-2.316863\times10^\wedge-8$, an outer $12^{th}$ order coefficient of $1.899045\times10^\wedge-8$, an inner (sensor side) radius of curvature of $-6.65269847$ mm, an inner clear semi-diameter of 3.60000000, an inner conic constant of $-1.605373$, an inner $4^{th}$ order coefficient of $1.286707\times10^\wedge-3$, an inner $6^{th}$ order coefficient of $-2.69852468\times10^\wedge-4$, an inner $8^{th}$ order coefficient of $3.488667\times10^\wedge-5$, an inner $10^{th}$ order coefficient of $-3.167066\times10^\wedge-6$, an inner $12^{th}$ order coefficient of $9.373795\times10^\wedge-8$, and a center thickness of 2.659567 mm. The air gap between the L8 lens 424 and the sensor cover glass 432 has a center thickness of 1.472662 mm. The sensor cover glass 432 may be made from H-K9L (with index of refraction 1.517 and abbe number 64.2) and has a thickness of 0.500000 mm and a clear semi-diameter of 4.00000000. The air gap between the sensor cover glass 432 and the image plane 430 has thickness of 1.26732 mm.

Figure 5A:
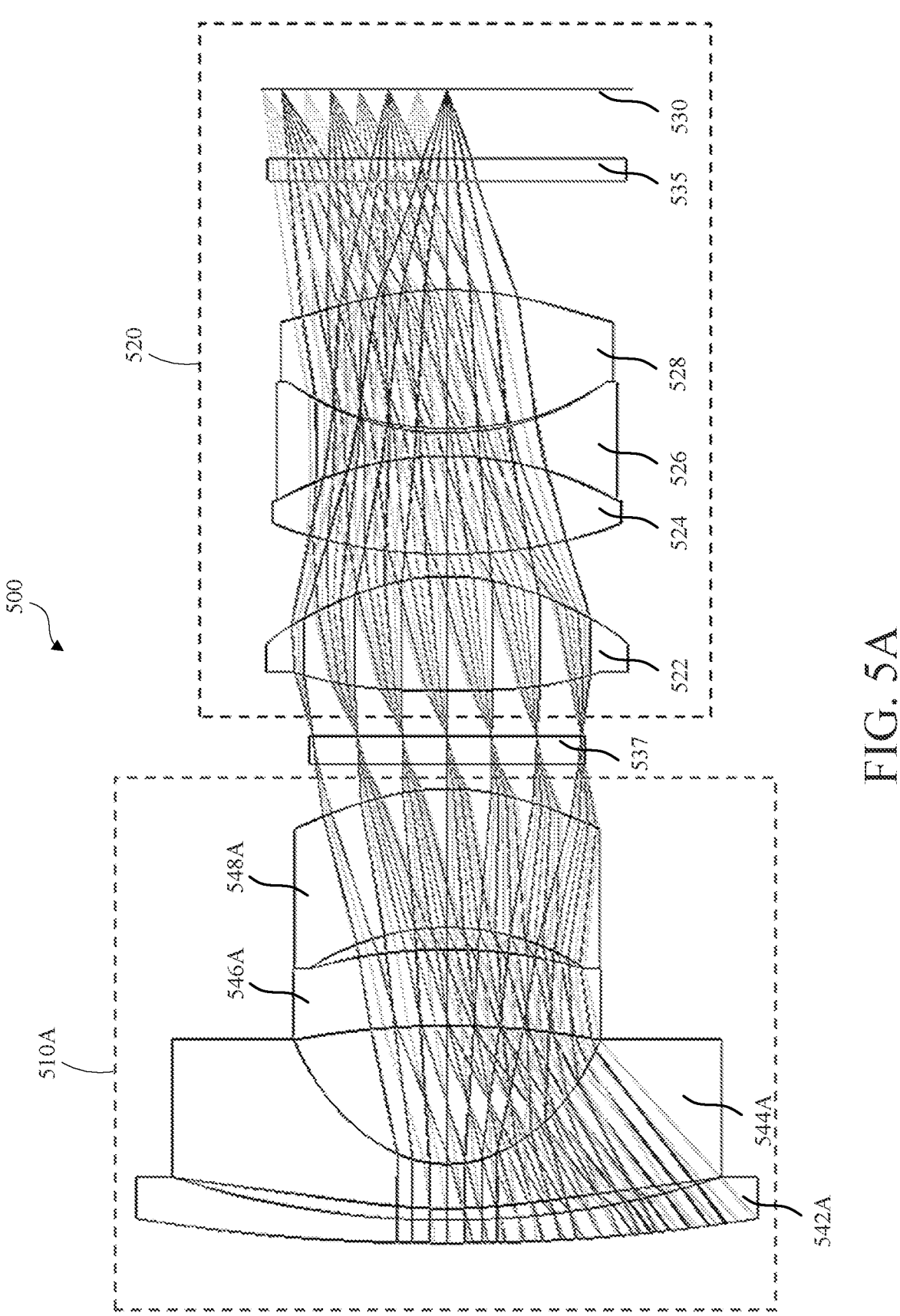
FIGS. 5A-5C are block diagrams of example modular lens assemblies in accordance with embodiments of this disclosure.
Figure 5B:
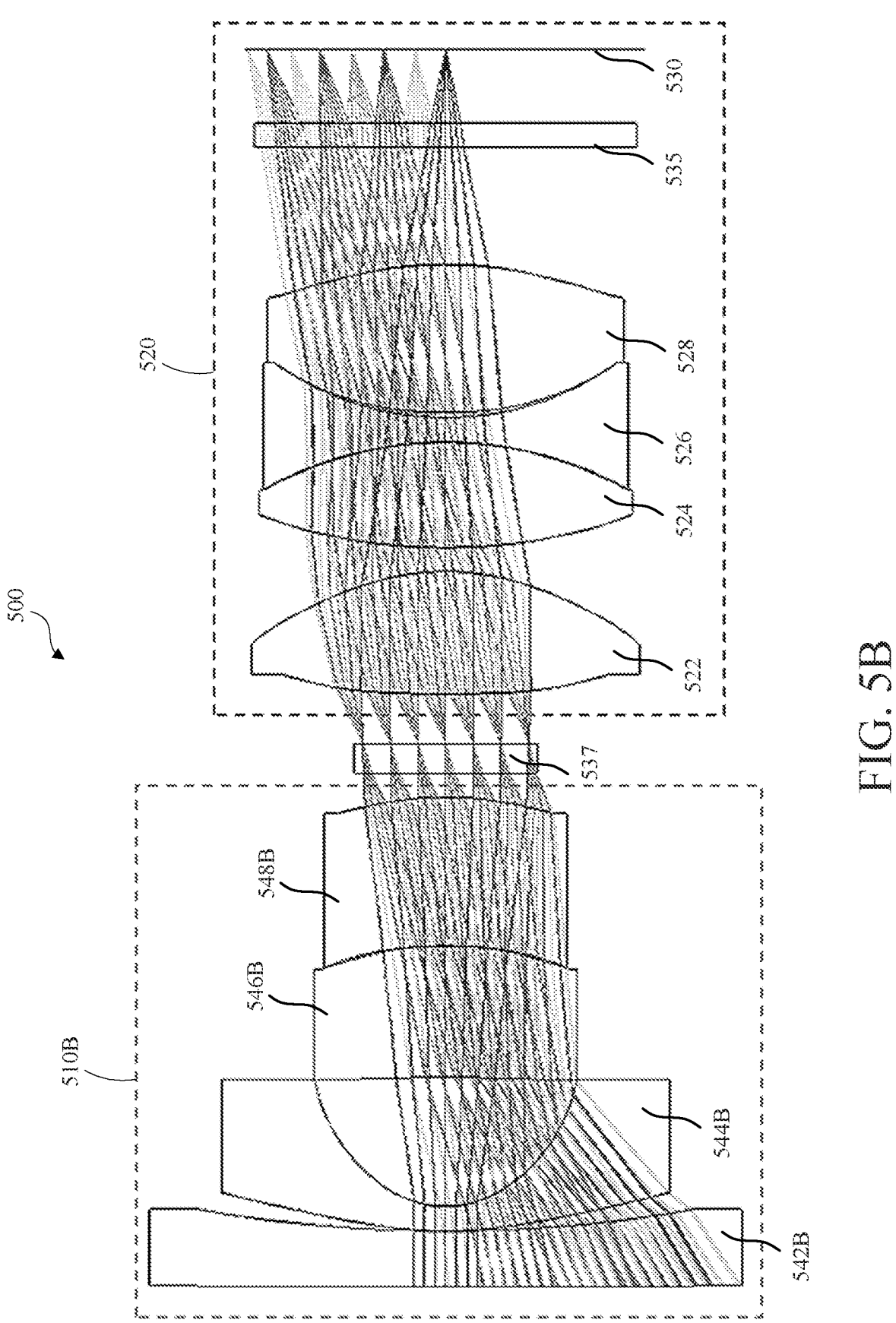
Figure 5C:
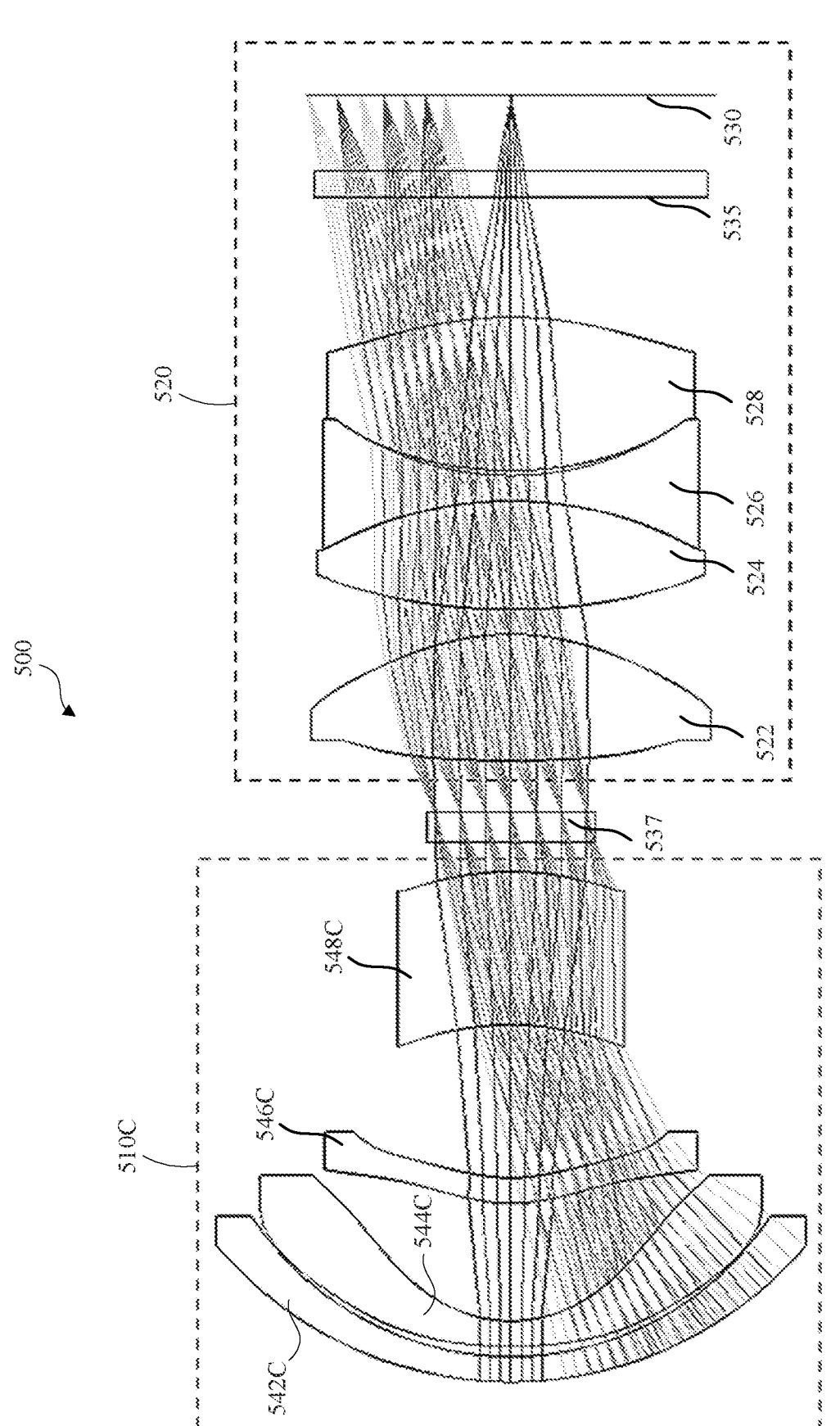

FIGS. 5A-5C are block diagrams of example modular lens assemblies 500 in accordance with embodiments of this disclosure. As shown in FIGS. 5A-5C, the modular lens assemblies 500 include a removable portions 510A-510C and a fixed portion 520. The removable portions 510A-510C may be external to or at least partially external to the camera housing (not shown). The fixed portion 520 may be internal to or at least partially internal to the camera housing. The fixed portion 520 includes a lens stack that includes an L5 lens 522, an L6 lens 524, an L7 lens 526, and an L8 lens 528. The L5 lens 522, L6 lens 524, and L7 lens 526 may be spherical elements, and the L8 lens 528 may be an aspherical element. The fixed portion 520 may have a narrow FOV and a high distortion when compared to a typical camera base lens having an approximate 1530 diagonal FOV. For example, the fixed portion 520 may have a diagonal FOV that ranges approximately from 20° to 40°. For example, the diagonal FOV for the fixed portion 520 may be approximately 30°. In some examples, the fixed portion 520 may be afocal. Light incident on an outer lens of the removable portions 510A-510C is refracted through the lens stack of the fixed portion 520 to an image sensor 530. The image sensor 530 is positioned at an end of the modular lens assembly 500 and is configured to capture images based on the light incident on the image sensor 530 through the respective lens stacks of the removable portions 510A-510C and the fixed portion 520. The fixed portion 520 may include a sensor cover glass 535 between the image sensor 530 and the L8 lens 528. A flat glass 537 may be included between the two lens portions to act as a dust and water seal. The flat glass 537 may be attached to the camera housing. The flat glass 537 may be positioned so that it is flush with an exterior surface of the camera housing. In other examples, the flat glass 537 may be positioned such that it protrudes from the camera housing or may be recessed within camera housing.

The removable portions 510A-510C are configured to be interchangeable and each removable portion may be used to determine the FOV, aperture stop, optical distortion, depth-of-field (DOF), focal distance, or any combination thereof, of the image capture device. For example, removable portion 510A may be attached to the fixed portion 520 to form a lens with F/1.5, a 156° FOV, and a custom distortion profile. In this example, the removable portion 510A includes a lens stack that includes an outer lens, such as L1 lens 542A, an L2 lens 544A, an L3 lens 546A, and an L4 lens 548A. Negative elements L1 lens 542A and L2 lens 544A may be used to reduce the pupil aberration. L1 lens 542A and L3 lens 546A may be spherical elements, and L2 lens 544A and L4 lens 548A may be aspherical elements. The lens stack including L1 lens 542A, L2 lens 544A, L3 lens 546A, and L4 lens 548A is configured to refract the light incident to produce a near-collimated (i.e., substantially parallel) ray path or a collimated (i.e., parallel) ray path. A collimated ray path may be a perfectly collimated light beam with no divergence. A near-collimated ray path may be a light beam that has a full beam divergence angle between 1.18 to 2.0 times the half-angle divergence defined via the Gaussian beam radius ($1/e^2$ radius). The fixed portion 520 is configured to receive the near-collimated ray path or the collimated ray path. In this example, the lens stack of the removable portion 510A determines the f-number, the FOV, and the distortion profile, and in combination with the lens stack of the fixed portion 520 is configured to form a lens with F/1.5, a 156° FOV, and a custom distortion profile.

In another example, the removable portion 510B may be attached to the fixed portion 520 to form a lens with F/2.5, a 156° FOV, and a custom distortion profile. In this example, the removable portion 510B includes a lens stack that includes an outer lens, such as L1 lens 542B, an L2 lens 544B, an L3 lens 546B, and an L4 lens 548B. Negative elements L1 lens 542B and L2 lens 544B may be used to reduce the pupil aberration. L1 lens 542B and L3 lens 546B may be spherical elements, and L2 lens 544B and L4 lens 548B may be aspherical elements. The lens stack including L1 lens 542B, L2 lens 544B, L3 lens 546B, and L4 lens 548B is configured to refract the light incident to produce a near-collimated (i.e., substantially parallel) ray path or a collimated (i.e., parallel) ray path. A collimated ray path may be a perfectly collimated light beam with no divergence. A near-collimated ray path may be a light beam that has a full beam divergence angle between 1.18 to 2.0 times the half-angle divergence defined via the Gaussian beam radius (1/e$^2$ radius). The fixed portion 520 is configured to receive the near-collimated ray path or the collimated ray path. In this example, the lens stack of the removable portion 510B determines the f-number, the FOV, and the distortion profile, and in combination with the lens stack of the fixed portion 520 is configured to form a lens with F/2.5, a 156° FOV, and a custom distortion profile.

In another example, the removable portion 510C may be attached to the fixed portion 520 to form a rectilinear lens with F/2.8, a 100° FOV, and a linear distortion profile. In this example, the removable portion 510C includes a lens stack that includes an outer lens, such as L1 lens 542C, an L2 lens 544C, an L3 lens 546C, and an L4 lens 548C. Negative elements L1 lens 542C and L2 lens 544C may be used to reduce the pupil aberration. L1 lens 542C and L3 lens 546C may be spherical elements, and L2 lens 544C and L4 lens 548C may be aspherical elements. The lens stack including L1 lens 542C, L2 lens 544C, L3 lens 546C, and L4 lens 548C is configured to refract the light incident to produce a near-collimated (i.e., substantially parallel) ray path or a collimated (i.e., parallel) ray path. A collimated ray path may be a perfectly collimated light beam with no divergence. A near-collimated ray path may be a light beam that has a full beam divergence angle between 1.18 to 2.0 times the half-angle divergence defined via the Gaussian beam radius (1/e$^2$ radius). The fixed portion 520 is configured to receive the near-collimated ray path or the collimated ray path. In this example, the lens stack of the removable portion 510A determines the f-number, the FOV, and the distortion profile, and in combination with the lens stack of the fixed portion 520 is configured to form a lens with F/2.8, a 1000 FOV, and a linear distortion profile.

The embodiments for the removable portions 510A-510C are not limited to the examples shown in FIGS. 5A-5C. For example, the removable portions 510A-510C may be configured to form other lenses in combination with the fixed portion 520. Example configurations may include forming a fixed focus lens with F/2.5, a 150° FOV, and a custom distortion profile; a low light lens having a fixed focus, manual focus, or autofocus (AF), F/1.5, a 150° FOV, and a custom distortion profile; a hyper-hemispherical lens having a fixed focus and an approximately 1750 FOV; an under-water hyper-hemispherical lens that is optimized for under-water image capture without a cover glass; an approximate 25 mm equivalent lens having a fixed focus, manual focus, or AF, F/2.8, approximately 800 FOV, and a rectilinear distortion; an approximate 50 mm equivalent lens having an AF, F/1.5, approximately 470 FOV, and a rectilinear distortion; an approximate 85 mm equivalent lens for short tele/portrait image capture having AF, approximately 29° FOV, and a rectilinear distortion; and a macro lens optimized for near focus.

Figure 6:
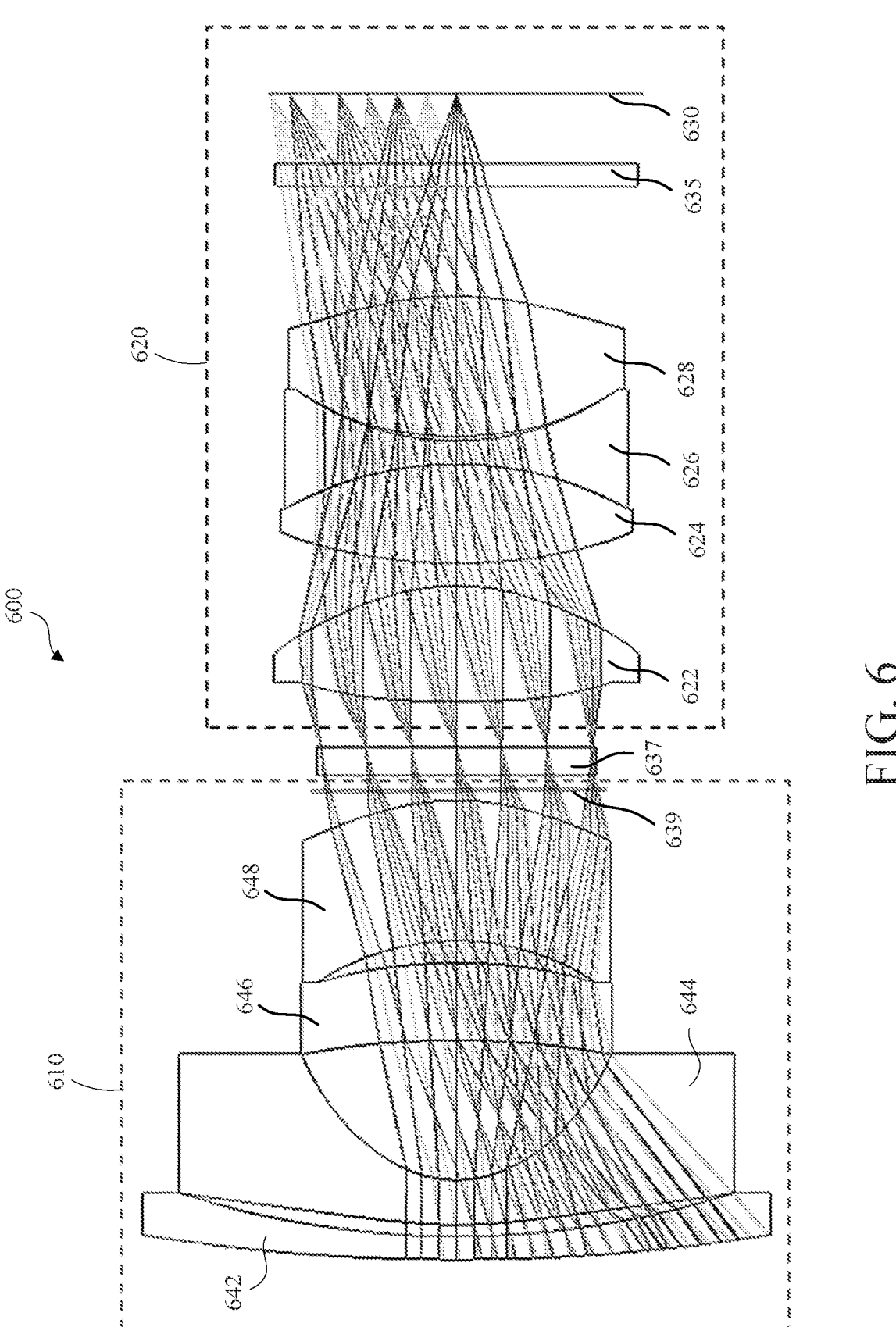
FIG. 6 is a block diagram of another example of a modular lens assembly.

FIG. 6 is a block diagram of another example of a modular lens assembly 600. As shown in FIG. 6, the modular lens assembly 600 includes a removable portion 610 and a fixed portion 620. The removable portion 610 may be external to or at least partially external to the camera housing (not shown). The fixed portion 620 may be internal to or at least partially internal to the camera housing. The fixed portion 620 includes a lens stack that includes an L5 lens 622, an L6 lens 624, an L7 lens 626, and an L8 lens 628. The L5 lens 622, L6 lens 624, and L7 lens 626 may be spherical elements, and the L8 lens 628 may be an aspherical element. The fixed portion 620 may have a narrow FOV and high distortion when compared to a typical camera base lens having an approximate 1530 diagonal FOV. For example, the fixed portion 620 may have a diagonal FOV that ranges approximately from 20° to 40°. For example, the diagonal FOV for the fixed portion 620 may be approximately 30°. In some examples, the fixed portion 620 may be afocal. Light incident on an outer lens of the removable portion 610 is refracted through the lens stack of the fixed portion 620 to an image sensor 630. The image sensor 630 is positioned at an end of the modular lens assembly 600 and is configured to capture images based on the light incident on the image sensor 630 through the respective lens stacks of the removable portion 610 and the fixed portion 620. The fixed portion 620 may include a sensor cover glass 635 between the image sensor 630 and the L8 lens 628. A flat glass 637 may be included between the two lens portions to act as a dust and water seal. The flat glass 637 may be attached to the camera housing. The flat glass 637 may be positioned so that it is flush with an exterior surface of the camera housing. In other examples, the flat glass 637 may be positioned such that it protrudes from the camera housing or may be recessed within the camera housing.

The removable portion 610 may include an optical device 639. The optical device 639 may be positioned between the L4 lens 648 and the back end of the removable portion 610. In an example, the optical device 639 may be an aperture stop. The aperture stop may allow for a secondary aperture stop to be used with the removable portion 610 to increase the f-number without over-compromising the optical performance. In another example, the optical device 639 may be a filter. The filter may have a low angle of incidence. The filter may be built into the removable portion 610 or it may be interchangeable. Any type of filter may be used, for example, absorptive neutral density (NDA) filters, dive filters, polarizing filters, or electrically adjustable filters such as an LCD-based neutral density (ND) filter.

The removable portion 610 is configured to be interchangeable and each removable portion may be used to determine the FOV, aperture stop, optical distortion, DOF, focal distance, or any combination thereof, of the image capture device. For example, removable portion 610 may be attached to the fixed portion 520 to form a lens with F/1.5, a 156° FOV, and a custom distortion profile. In this example, the removable portion 610 includes a lens stack that includes an outer lens, such as L1 lens 642, an L2 lens 644, an L3 lens 646, and an L4 lens 648. Negative elements L1 lens 642 and L2 lens 644 may be used to reduce the pupil aberration. L1 lens 642 and L3 lens 646 may be spherical elements, and L2 lens 644 and L4 lens 648 may be aspherical elements. The lens stack including L1 lens 642, L2 lens 644, L3 lens 646, and L4 lens 648 is configured to refract the light incident to produce a near-collimated (i.e., substantially parallel) ray path or a collimated (i.e., parallel) ray path. A collimated ray path may be a perfectly collimated light beam with no divergence. A near-collimated ray path may be a light beam that has a full beam divergence angle between 1.18 to 2.0 times the half-angle divergence defined via the Gaussian beam radius ($1/e^2$ radius). The fixed portion 620 is configured to receive the near-collimated ray path or the collimated ray path. In this example, the lens stack of the removable portion 610 determines the f-number, the FOV, and the distortion profile, and in combination with the lens stack of the fixed portion 620 is configured to form a lens with F/1.5, a 1560 FOV, and a custom distortion profile.

Figure 7:
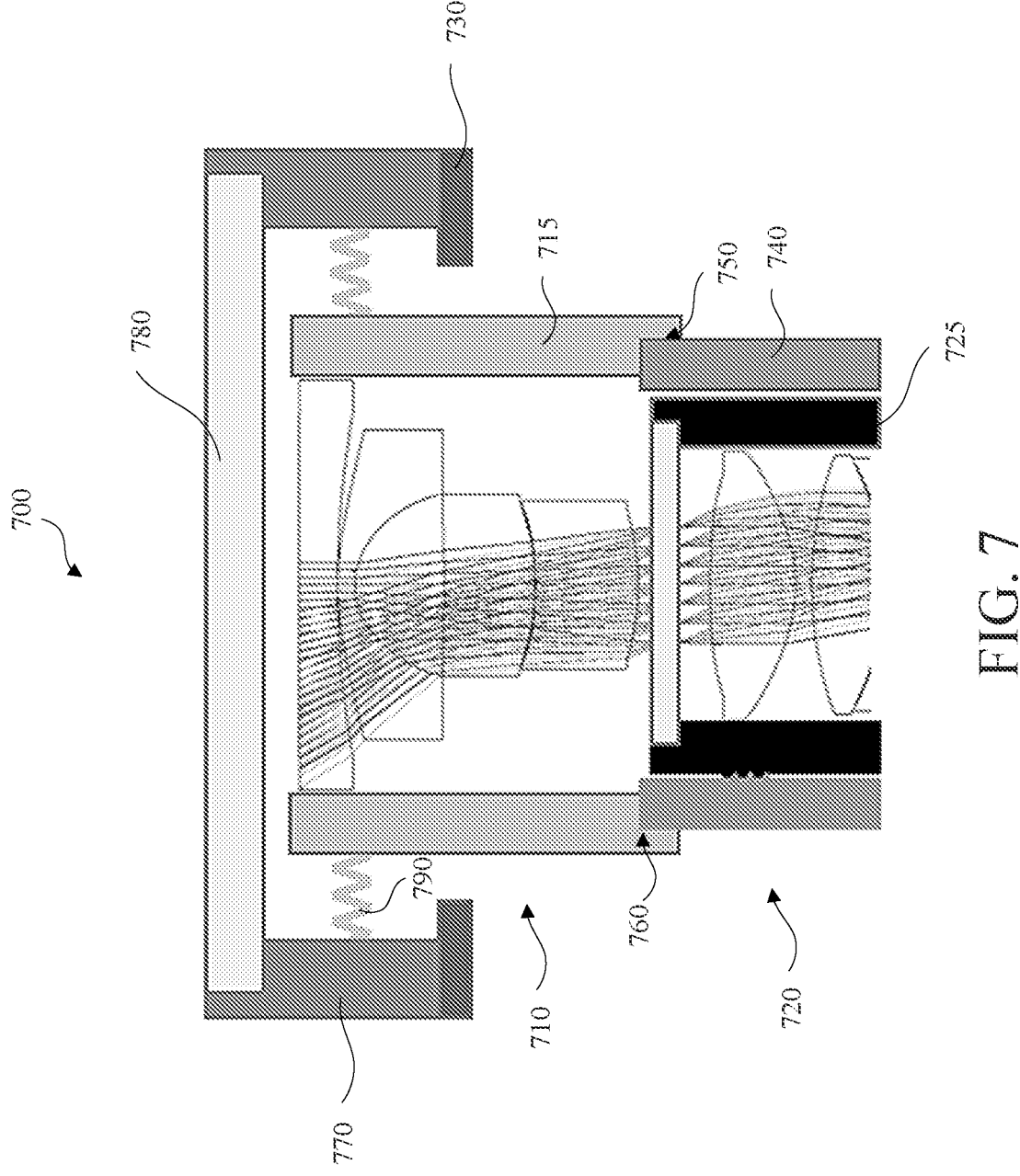
FIG. 7 is a block diagram of an example of a modular lens assembly mounting system.

FIG. 7 is a block diagram of an example of a modular lens assembly mounting system 700. In this example, the modular lens assembly mounting system 700 includes a modular lens assembly, such as the modular lens assemblies 500 and 600 shown in FIGS. 5A-5C and 6, that includes a removable portion 710 and a fixed portion 720. The removable portion 710 includes a barrel 715, and the fixed portion 720 includes a barrel 725. As shown in FIG. 7, the fixed portion 720 is positioned internal to a camera housing 730 and the removable portion is positioned partially internal to the camera housing 730.

The modular lens assembly mounting system 700 may include a fixed lens mount 740. The fixed lens mount 740 may be attached to an internal portion of the camera housing 730. The fixed lens mount 740 is configured to secure the fixed portion 720 in place. The barrel 725 may be secured to the fixed lens mount 740 using an adhesive, screws, clips, interlocking joints, or any combination thereof. The fixed lens mount 740 may include one or more guides to ensure proper attachment of the removable portion 720 to minimize the tolerance loop and maximize optical performance. The fixed lens mount 740 may include an electrical interface to allow communication between the removable portion 710 and the fixed portion 720. The fixed lens mount 740 may include a connector portion 750 that is configured to receive and secure barrel 715. The connector portion 750 may include the electrical interface. The connector portion 750 may include one or more clips, interlocking joints, or any suitable fastening assembly to removably secure barrel 715 in place. The barrel 715 may include an electrical interface to allow communication between the removable portion 710 and the fixed portion 720. The barrel 715 may include a connector portion 760 that is configured to connect to the connector portion 750. The connector portion 760 may include one or more clips, interlocking joints, or any suitable fastening assembly to removably secure barrel 715 in place.

In some embodiments, the modular lens assembly mounting system 700 may include a floating cover glass frame 770. The floating cover glass frame 770 may include a camera cover glass 780 to protect an outer lens of the removable portion. The floating cover glass frame 770 may be removably attached to an outer surface of the camera housing 730. The floating cover glass frame 770 may include a soft mount 790 that is configured to removably attach to an outer surface of the removable portion 720. The soft mount 790 may be a compressible component such a spring, a gasket, a foam seal, or any other compliant member.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An image capture device comprising:
a device housing;
a modular lens assembly comprising:
   a removable portion including a first lens stack, wherein the removable portion is at least partially external to the device housing and configured to produce a near-collimated to collimated ray path; and
   a fixed portion including a second lens stack, wherein the fixed portion is at least partially internal to the device housing, wherein the fixed portion is configured to receive the near-collimated to collimated ray path from the removable portion and is secured in place by a fixed lens mount with at least one guide configured to ensure proper attachment of the removable portion; and
an image sensor positioned at a first end of the modular lens assembly and configured to capture images based on light incident on the image sensor through the first lens stack and the second lens stack such that light incident on an outer lens of the first lens stack is refracted through the second lens stack to the image sensor, wherein the modular lens assembly is configured such that an optical axis of the removable portion and the fixed portion are automatically aligned upon attachment.

2. The image capture device of claim 1, wherein the removable portion determines any combination of a field-of-view (FOV), aperture stop, optical distortion, depth-of-field (DOF), and focal distance.

3. The image capture device of claim 2, further comprising a glass element positioned between the fixed portion and the removable portion, wherein the glass element is a flat glass configured to act as a dust and water seal and is attached to the device housing.

4. The image capture device of claim 1, further comprising an aperture stop positioned at an end of the removable portion.

5. The image capture device of claim 1 further comprising a filter positioned at an end of the removable portion.

6. The image capture device of claim 5, wherein the filter is a neutral density (ND) filter.

7. The image capture device of claim 6, wherein the ND filter is an electrically adjustable liquid-crystal display (LCD) ND filter.

8. The image capture device of claim 1, wherein the first lens stack comprises an L1 lens, an L2 lens, an L3 lens, and an L4 lens.

9. The image capture device of claim 8, wherein the L1 lens and the L3 lens are spherical elements, and the L2 lens and the L4 lens are aspherical elements.

10. The image capture device of claim 1, wherein the second lens stack comprises an L5 lens, an L6 lens, an L7 lens, and an L8 lens.

11. The image capture device of claim 10, wherein the L5 lens, the L6 lens, and the L7 lens are spherical elements, and the L8 lens is an aspherical element.

12. The image capture device of claim 1, wherein the fixed portion has a narrow FOV or is afocal, wherein the narrow FOV is a diagonal FOV between 20° and 40°.

13. A modular lens assembly mounting system comprising:
a modular lens assembly comprising:

a removable portion comprising at least one lens, a first barrel that includes a first connector, and at least one alignment feature configured to mate with a corresponding feature in a fixed lens mount; and a fixed portion comprising at least one lens and a second barrel that includes a second connector, wherein the second connector is configured to connect to the first connector, wherein the fixed lens mount is configured to secure the fixed portion in place via the second barrel, wherein the fixed lens mount includes at least one guide configured to ensure proper attachment of the removable portion, and wherein the fixed lens mount includes an electrical interface configured to allow communication between the removable portion and the fixed portion.

14. The modular lens assembly mounting system of claim 13, further comprising a glass element.

15. The modular lens assembly mounting system of claim 14, wherein the glass element is positioned between the fixed portion and the removable portion.

16. The modular lens assembly mounting system of claim 15, wherein the glass element is flush with a device housing of the modular lens assembly.

17. The modular lens assembly mounting system of claim 15, wherein the glass element is protruding from a device housing of the modular lens assembly.

18. The modular lens assembly mounting system of claim 15, wherein the glass element is recessed within a device housing of the modular lens assembly.

19. A modular lens assembly comprising:

a removable portion comprising at least one lens, a first barrel that includes a first connector, and at least one alignment feature configured to mate with a corresponding guide in a fixed portion; and the fixed portion comprising at least one lens and a second barrel that includes a second connector, wherein the second connector is configured to connect to the first connector, and wherein the fixed portion includes at least one guide to ensure proper attachment and automatic optical axis alignment of the removable portion upon connection.

20. The modular lens assembly of claim 19, wherein the at least one lens of the removable portion comprises an L1 lens, an L2 lens, an L3 lens, and an L4 lens, and wherein the L1 lens and the L3 lens are spherical elements, and the L2 lens and the L4 lens are aspherical elements.

* * * * *